(12) United States Patent
Tang (10) Patent No.: US 7,463,433 B2
(45) Date of Patent: Dec. 9, 2008

(54) OPTICAL LENS ASSEMBLY

(75) Inventor: Hsiang Chi Tang, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 35 days.

(21) Appl. No.: 11/549,102

(22) Filed: Oct. 12, 2006

(65) Prior Publication Data

US 2007/0236812 A1 Oct. 11, 2007

(30) Foreign Application Priority Data

Aug. 4, 2006 (TW) .............................. 95128678 A (51) Int. Cl.
*G02B 9/10* (2006.01)

(52) U.S. Cl. ...................... 359/795; 359/717; 359/736; 359/793

(58) Field of Classification Search ......... 359/686–692, 359/713–717, 733–736, 746–748, 750–753, 359/755–760, 762–769, 771–780, 782–795, 359/796, 797

See application file for complete search history.

(56) References Cited

U.S. PATENT DOCUMENTS

| 6,813,100 | B2* | 11/2004 | Yamaguchi et al. | ......... 359/793 |
| 2005/0041306 | A1* | 2/2005 | Matsuo | ...................... 359/689 |
| 2005/0254147 | A1* | 11/2005 | Wang et al. | .................. 359/717 |

* cited by examiner

*Primary Examiner*—Darryl J Collins
(74) *Attorney, Agent, or Firm*—Banger Shia (57) ABSTRACT

An optical lens assembly comprises two plastic lenses with refractive power: from the object side to the image side: a first lens with positive refractive power, and a second lens with negative refractive power. A front surface and a rear surface of the first lens is convex and aspherical, a refractive index N1 of the first lens satisfies the relation: 1.6>N1>1.5, a focal length of the first lens is f1, and a focal length of optical system is f, and they satisfy the relation: f/f1>2.0. A front surface of the second lens is concave, a rear surface of the second lens is convex, and both the front and rear surfaces is aspherical, a refractive index N2 of the second lens satisfies the relation: N2>1.55. An aperture is located in front of the first lens for controlling the brightness of the optical system.

9 Claims, 9 Drawing Sheets

( Embodiment 1 )
F = 1.53 mm, Fno = 2.8, HFOV = 30.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.081 | | | | |
| 2 | Lens 1 | 2.18647(ASP) | 0.699 | Plastic | 1.543 | 60.3 | 0.69 |
| 3 | | -0.40235(ASP) | -0.265 | | | | |
| 4 | | Plano | 0.395 | | | | |
| 5 | Lens 2 | -0.24930(ASP) | 0.412 | Plastic | 1.583 | 30.2 | -1.88 |
| 6 | | -0.51870(ASP) | 0.200 | | | | |
| 7 | IR-filter | Plano | 0.300 | Glass | 1.517 | 64.1 | |
| 8 | | Plano | 0.770 | | | | |
| 9 | Image | Plano | | | | | |

TABLE 1

| Surface # | k | Aspherical Coefficient | | | | | |
|---|---|---|---|---|---|---|---|
| | | A4 | A6 | A8 | A10 | A12 | A14 |
| 2 | -1.57641E+01 | -1.13735E+00 | 1.97479E+01 | -2.84013E+02 | 8.32155E+02 | - | - |
| 3 | -1.06416E+00 | 3.16994E-01 | -3.48010E+00 | 9.85138E+00 | -1.88537E+02 | 9.31405E+02 | -1.45696E+03 |
| 5 | -1.18848E+00 | 7.97658E-01 | 1.76990E+01 | -2.10179E-02 | 9.30049E+02 | -1.47688E+03 | 4.02864E+02 |
| 6 | -3.39143E+00 | -1.35033E+00 | 7.94356E+00 | -1.27500E+01 | -2.53080E+01 | 1.29449E+02 | -1.33906E+02 |

TABLE 2

(Embodiment 2)

F = 1.38 mm, Fno = 2.8, HFOV = 33.0deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.104 | | | | |
| 2 | Lens 1 | 1.78647(ASP) | 0.733 | Plastic | 1.543 | 60.3 | 0.59 |
| 3 | | -0.33751(ASP) | -0.278 | | | | |
| 4 | | Plano | 0.394 | | | | |
| 5 | Lens 2 | -0.20014(ASP) | 0.350 | Plastic | 1.583 | 30.2 | -1.45 |
| 6 | | -0.43127(ASP) | 0.200 | | | | |
| 7 | IR-filter | Plano | 0.300 | Glass | 1.517 | 64.1 | - |
| 8 | | Plano | 0.610 | | | | |
| 9 | Image | Plano | | | | | |

TABLE 3

| Surface # | k | A4 | A6 | A8 | A10 | A12 | A14 |
|---|---|---|---|---|---|---|---|
| | | | | Aspherical Coefficient | | | |
| 2 | -3.05121E+01 | -7.20787E-01 | 1.82546E+01 | -3.34209E+02 | 1.09400E+03 | - | - |
| 3 | -1.99218E+00 | -1.56014E+00 | 4.76167E-01 | 1.28727E+01 | -2.19738E+02 | 9.31404E+02 | -1.45696E+03 |
| 5 | -1.29521E+00 | 9.09256E-01 | 1.95754E+01 | -2.15278E+02 | 9.16709E+02 | -1.47688E+03 | 4.02864E+02 |
| 6 | -2.26793E+00 | -9.46301E-01 | 9.34716E+00 | -1.80882E+01 | -2.34146E+01 | 1.54860E+02 | -1.78459E+02 |

TABLE 4

|  | Embodiment 1 | Embodiment 2 |
| --- | --- | --- |
| F | 1.53 | 1.38 |
| Fno | 2.8 | 2.8 |
| HFOV | 30.2 | 33.0 |
| N1 | 1.543 | 1.543 |
| N2 | 1.583 | 1.583 |
| f/f1 | 2.21 | 2.34 |
| \|f/f2\| | 0.81 | 0.95 |
| V1 | 60.3 | 60.3 |
| V2 | 30.2 | 30.2 |
| R1 | 2.18647 | 1.78647 |
| (R1+R2)/(R1−R2) | 1.451 | 1.466 |

TABLE 5

OPTICAL LENS ASSEMBLY

BACKGROUND OF THE INVENTION

1. Field of the Invention

The present invention relates to an optical lens assembly, and more particularly to a miniaturized optical lens assembly used in camera mobile phone.

2. Description of the Prior Art

In recent years, with the popularity of camera mobile phone, the image-taking lens has been becoming thinner and thinner, and the photosensitive assembly of a general digital camera is nothing more than CCD (charge coupled device) or CMOS (Complementary Metal Oxide Semiconductor). Due to the advancement of the semiconductor technique, the pixel size of photosensitive assembly has been reduced from the early 7.4 um to the current 1.75 um. Therefore, the demand for miniaturization of the image-taking lens assembly becomes increasingly urgent.

In consideration of aberration compensation, a conventional mobile phone's lens assembly usually takes the form of a triplet lens design, and the most commonly seen triplet type is positive, negative and positive. However, when the height of the lens assembly is reduced from 5 mm to 3 mm, the size of the image forming system will be reduced, and this makes it difficult to install the three pieces of lens. Further, the thickness of the lenses must also be reduced, and this makes the uniformity of the plastic-injection-molded lens difficult to control.

The present invention has arisen to mitigate and/or obviate the afore-described disadvantages.

SUMMARY OF THE INVENTION

To solve the abovementioned problem, an optical lens assembly in accordance with the present invention, comprises two plastic lenses with refractive power, that is, a first lens with positive refractive power, and a second lens with negative refractive power are arranged in order from the object side to the image side. A front surface and a rear surface of the first lens are convex and aspherical. A front surface of the second lens is concave, while a rear surface of the second lens is convex, and both the front and rear surfaces are aspherical. An IR (infrared) cut filter is disposed between the second lens and a photosensitive assembly and has no influence on the focal length of the optical system. The optical lens assembly is further provided with an aperture located in front of the first lens for controlling the brightness of the optical system.

A refractive index of the first lens is N1, a refractive index of the second lens is N2, and they satisfy the relation: $1.6 > N1 > 1.5$, and $N2 > 1.55$.

The above relations can allow the optical lens assembly to obtain an effective refractive power, further, the refractive indices of the first and second lenses satisfy the relation: $N1 > 1.54$, and $N2 < 1.65$.

The refractive power of the optical lens assembly is mainly provided by the first lens, and the second lens with negative power is used to balance and correct the aberrations caused by the optical system. However, if the refractive index of the second lens is greater than the abovementioned maximum value, the height of the optical system will be increased. Therefore, by adjusting the refractive index of the respective lenses properly, the refractive power and the aberration of the optical lens assembly can be balanced.

The focal length of the first lens is f1, the focal length of the second lens is f2, and the focal length of optical system is f, and they satisfy the relation: $f/f1 > 2.0$ and $|f/f2| < 1.0$.

By increasing the refractive power of the first lens, the height of the optical lens assembly can be reduced, and the incident angle of the light with respect to photosensitive assembly can be reduced effectively. The negative power of the second lens is provided by the front surface and is employed to correct the aberration caused by the optical system. However, if the refractive power is excessively great, the incident angle of the light with respect to photosensitive assembly will be increased, and the aspherical surface of the rear surface of the second lens will be too strong to produce. In consideration of the suppression of the high order aberration, and in order to produce enough back focal length for the optical lens assembly, the focal length of the first lens f1, and the focal length of optical system f will satisfy the equation: $f/f1 < 2.5$ To effectively correct the chromatic aberration caused by the optical lens assembly, the Abbe number V1 of the first lens and the Abbe number V2 of the second lens satisfy the relations: $V1 > 50$, and $V2 < 40$.

To effectively reduce the incident angle of the light with respect to the photosensitive assembly, the radius of curvature R1 of the front surface of the first lens and the radius of curvature R2 of the rear surface of the first lens satisfy the relation: $1.4 < (R1+R2)/(R1-R2) < 1.55$.

With the front aperture, and the strong refractive power provided by the rear surface of the first lens, the exit pupil of the optical lens assembly will be far away from the image plane. Therefore, after leaving the rear surface of the second lens, the light will be vertically projected onto the photosensitive assembly, this is the telecentric feature of the image side, and this feature is very important to the photosensitive power of the current solid photosensitive assembly, and can improve the photosensitivity of the photosensitive assembly while reducing the probability of the occurrence of shading. The abovementioned relation is called the shape factor of the lens. If the value is smaller than the minimum value, R2 will be relatively small, and the optical system will have an excessively large aberration. On the other hand, if the value is higher than the maximum value, R2 will be too large, the refractive power of the rear surface of the first lens will be reduced. As a result, it must move the aperture forward, otherwise the incident angle of the light with respect to the photosensitive assembly cannot be reduced, and this will be contrary to the goal of miniaturization of the optical lens assembly.

In addition, the trend of miniaturization of the optical lens assembly, and of increasing the view of angle, the radius of curvature and the size of the lenses must be reduced, and it is impossible to make such glass lenses by the use of the conventional grind method. The first and second lenses are made of plastic injection molding, using a relatively low cost to produce high precision lenses. Each of the surfaces of the lenses is an aspherical surface that is easily made, obtaining much more controlled variables, so as to reduce the aberration and the number of the lenses.

BRIEF DESCRIPTION OF THE DRAWINGS

Table 1 shows the data of the structure of the first emobdiment.

Table 2 shows the aspheric data of the first emobdiment.

Table 3 shows the data of the structure of the second emobdiment.

Table 4 shows the aspheric data of the second emobdiment; and

Table 5 shows the data of the respective embodiments resulted from the equations.

DETAILED DESCRIPTION OF THE PREFERRED EMBODIMENTS

The present invention will be more clear from the following description when viewed together with the accompanying drawings, which show, for purpose of illustrations only, the preferred embodiment in accordance with the present invention.

Figure 1:
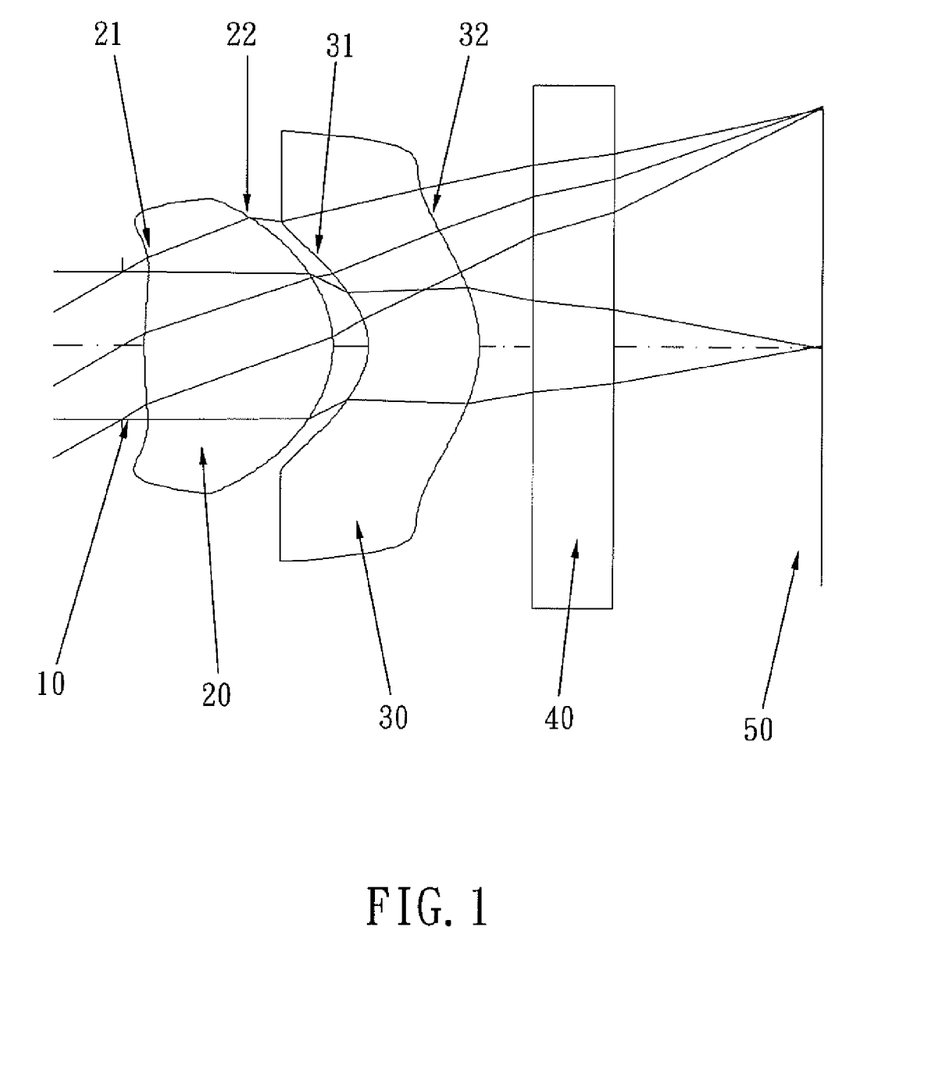
FIG. 1 shows an optical lens assembly in accordance with a first embodiment of the present invention.
Figure 2:
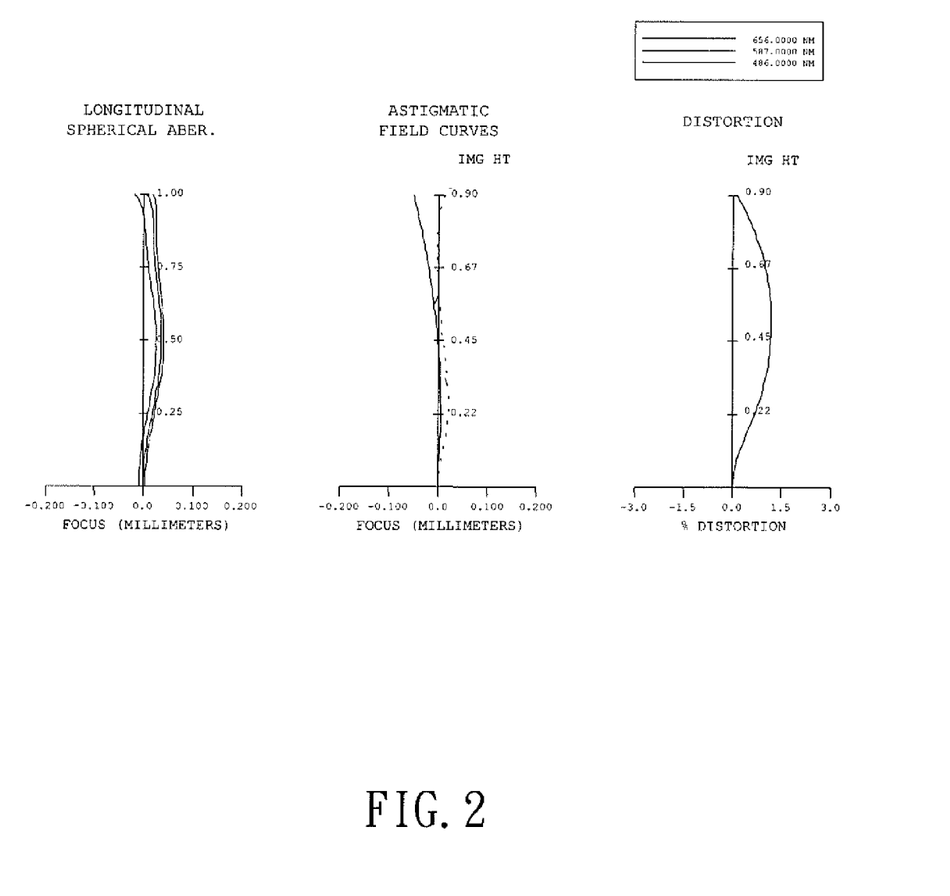
FIG. 2 shows the aberration correction of the first embodiment the present invention.

Referring to FIG. 1, which shows an optical lens assembly in accordance with a first embodiment of the present invention, and FIG. 2 shows the aberration correction of the first embodiment the present invention. The optical lens assembly of the first embodiment comprises two plastic lenses with refractive power, that is, a first lens 20 with positive refractive power, and a second lens 30 with negative refractive power are arranged in order from the object side to the image side. A front surface 21 and a rear surface 22 of the first lens 20 are convex and aspherical. A front surface 31 of the second lens 30 is concave, while a rear surface 32 of the second lens 30 is convex, and both the front and rear surfaces 31 and 32 are aspherical. An IR (infrared) cut filter 40 is disposed between the second lens 30 and a photosensitive assembly 50 and has no influence on the focal length of the optical system. The optical lens assembly is further provided with an aperture 10 located in front of the first lens 20 for controlling the brightness of the optical system.

The refractive index N1 of the first lens 20 with positive refractive power is 1.543, and the refractive index N2 of the second lens 30 with negative refractive power is 1.583.

The focal length of the first lens 20 with positive refractive power is f1, the focal length of the second lens 30 with negative refractive power is f2, the focal length of the optical system is f, they satisfy the relations: f/f1=2.21, and |/f2|=0.81.

The Abbe Number V1 of the first lens 20 is 60.3, and the Abbe number V2 of the second lens 30 is 30.2.

The radius of curvature of the front surface 21 of the first lens 20 is R1, the radius of curvature of the rear surface 22 of the first lens 20 is R2, and they satisfy the relation: (R1+R2)/(R1−R2)=1.451.

The radius of curvature R1 of the front surface 21 of the first lens 20 is 2.18647 mm.

The first lens 20 and the second lens 30 are made by plastic injection molding, each of the surfaces of the first and second lenses 20 and 30 is an aspherical surface, and the equation of the curve of the aspherical surfaces is expressed as follows:

$$X(Y)=(Y^2/R)/(1+\text{sqrt}(1-(+k)*(Y/R)^2))+A_4*Y^4+A_6*Y^6+\ldots$$

Wherein:

X: represents the distance of the cross section of the lens;

Y: the height from the point on the curve of the aspherical surface to the optical axis;

K: represents the conical coefficients;

$A_4, A_6 \ldots$ the aspheric coefficients of the fourth and sixth order and etc.

The data of the structure of the first emobdiment is shown in table 1, and the aspheric data is shown in table 2.

Figure 3:
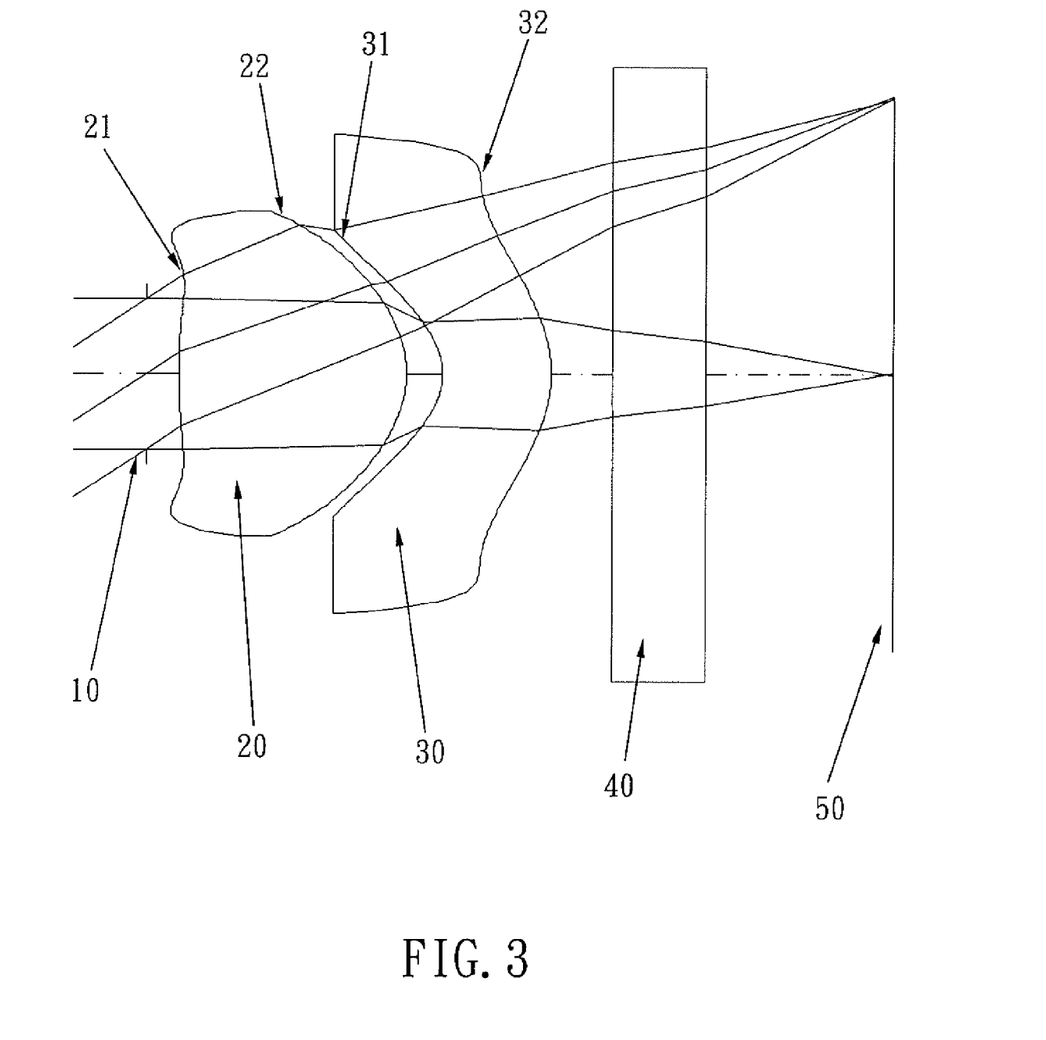
FIG. 3 shows an optical lens assembly in accordance with a second embodiment of the present invention.
Figure 4:
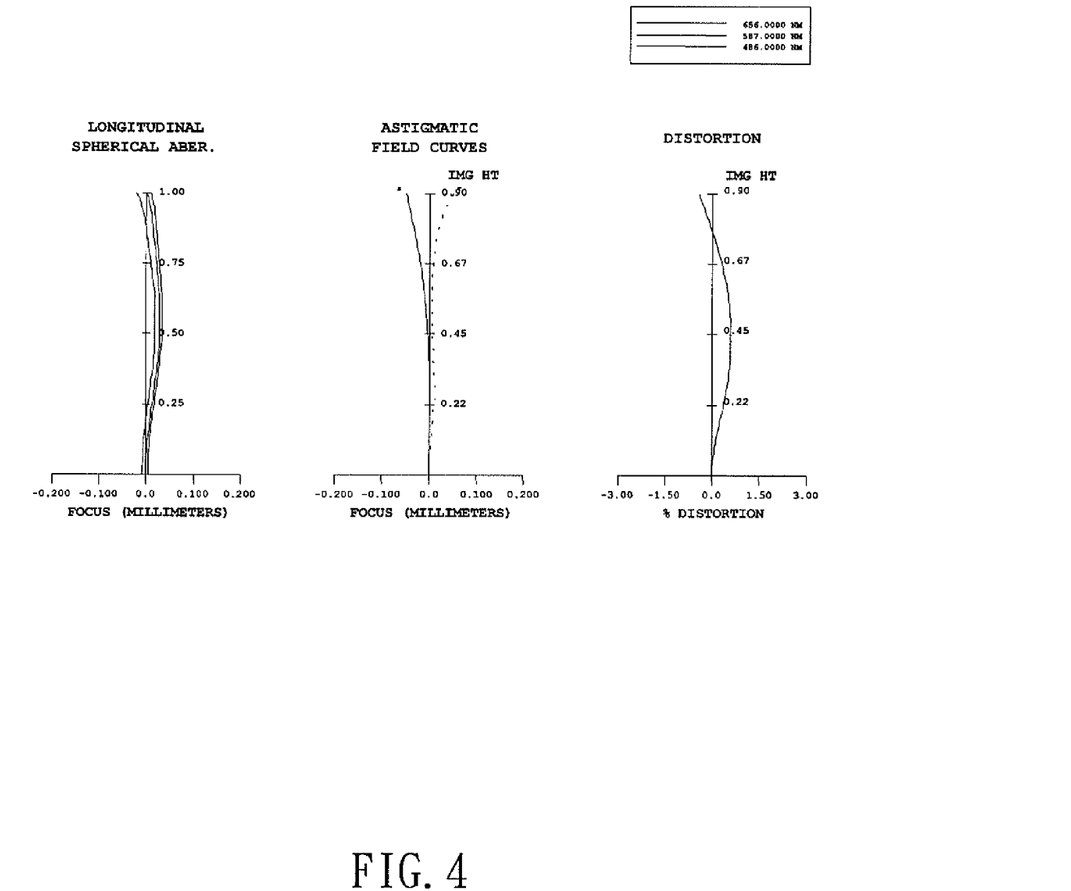
FIG. 4 shows the aberration correction of the second embodiment the present invention.

Referring to FIG. 3, which shows an optical lens assembly in accordance with a second embodiment of the present invention, and FIG. 4 shows the aberration correction of the second embodiment the present invention. The optical lens assembly of the second embodiment comprises two plastic lenses with refractive power, that is, a first lens 20 with positive refractive power, and a second lens 30 with negative refractive power are arranged in order from the object side to the image side. A front surface 21 and a rear surface 22 of the first lens 20 are convex and aspherical. A front surface 31 of the second lens 30 is concave, while a rear surface 32 of the second lens 30 is convex, and both the front and rear surfaces 31 and 32 are aspherical. An IR (infrared) cut filter 40 is disposed between the second lens 30 and a photosensitive assembly 50 and has no influence on the focal length of the optical system. The optical lens assembly is further provided with an aperture 10 located in front of the first lens 20 for controlling the brightness of the optical system.

The refractive index N1 of the first lens 20 with positive refractive power is 1.543, and the refractive index N2 of the second lens 30 with negative refractive power is 1.583.

The focal length of the first lens 20 with positive refractive power is f1, the focal length of the second lens 30 with negative refractive power is f2, the focal length of the optical system is f, they satisfy the relations: f/f1=2.34, and |/f2|=0.95.

The Abbe Number V1 of the first lens 20 is 60.3, and the Abbe number V2 of the second lens 30 is 30.2.

The radius of curvature of the front surface 21 of the first lens 20 is R1, the radius of curvature of the rear surface 22 of the first lens 20 is R2, and they satisfy the relation: (R1+R2)/(R1−R2)=1.466.

The radius of curvature R1 of the front surface 21 of the first lens 20 is 1.78647 mm.

The first lens 20 and the second lens 30 are made by plastic injection molding, each of the surfaces of the first and second lenses 20 and 30 is an aspherical surface, and the equation of the curve of the aspherical surfaces is the same as the first embodiment.

The data of the structure of the second emobdiment is shown in table 3, and the aspheric data is shown in table 4.

It is to be noted that the tables 1-4 show different data of the different embodiments, however, the data of the different embodiments is obtained from experiments. Therefore, any product of the same structure is contemplated to be within the scope of the present invention even if it uses different data. Table 5 is the data of the respective embodiments resulted from the equations.

While we have shown and described various embodiments in accordance with the present invention, it is clear to those skilled in the art that further embodiments may be made without departing from the scope of the present invention.

What is claimed is:

1. An optical lens assembly comprising two plastic lenses with refractive power: from the object side to the image side:

a first lens with positive refractive power, a front surface and a rear surface of the first lens being convex and aspherical, a refractive index N1 of the first lens satisfies the relation: 1.6>N1>1.5, a focal length of the first lens is f1, and a focal length of optical system is f, and they satisfy the relation: f/f1>2.0;

a second lens with negative refractive power, a front surface of the second lens being concave, a rear surface of the second lens being convex, and both the front and rear surfaces being aspherical, a refractive index N2 of the second lens satisfies the relation: N2>1.55;

wherein an aperture is located in front of the first lens for controlling the brightness of the optical system;

the focal length of the second lens is f2, and the focal length of optical system is f, and they satisfy the relation: |f/f2|<1.0.

2. The optical lens assembly as claimed in claim 1, wherein the refractive index N1 of the first lens satisfies the relation: N1>1.54.

3. The optical lens assembly as claimed in claim 2, wherein an Abbe number V1 of the first lens satisfies the relation: V1>50.

4. The optical lens assembly as claimed in claim 3, wherein an Abbe number V2 of the second lens satisfies the relation: V2<40.

5. The optical lens assembly as claimed in claim 4, wherein the refractive index N2 of the second lens satisfies the relation: N2<1.65.

6. The optical lens assembly as claimed in claim 1, wherein the focal length of the first lens is f1, and the focal length of optical system is f, and they satisfy the relation: f/f1<2.5.

7. The optical lens assembly as claimed in claim 1, wherein a radius of curvature of the front surface of the first lens is R1, a radius of curvature of the rear surface of the first lens is R2, and they satisfy the relation: 1.4<(R1+R2)/(R1−R2)<1.55.

8. The optical lens assembly as claimed in claim 7, wherein the radius of curvature of the front surface of the first lens R1 satisfies the relation: R1<4.0 mm.

9. The optical lens assembly as claimed in claim 1, wherein an IRcut filter is arranged behind the second lens.

* * * * *